(12) United States Patent
Tsai

(10) Patent No.: US 6,304,019 B1
(45) Date of Patent: Oct. 16, 2001

(54) MAGNET GENERATOR

(76) Inventor: Pei-Chuan Tsai, 4F, No. 415-1, Hsin-Chuang Road, Hsin Chuang City, Taipei Hsien (TW)

( * ) Notice: Subject to any disclaimer, the term of this patent is extended or adjusted under 35 U.S.C. 154(b) by 0 days.

(21) Appl. No.: 09/610,976

(22) Filed: Jul. 6, 2000

(51) Int. Cl.[7] .................................................. H02K 7/00
(52) U.S. Cl. .................. 310/254; 310/67 R; 310/156.08
(58) Field of Search ........................ 310/156.08, 156.12, 310/156.26, 254, 258, 259, 74, 261, 90, 264, 91, 265, 267; 29/596–598

(56) References Cited

U.S. PATENT DOCUMENTS

| | | | |
|---|---|---|---|
| 5,065,060 | * 11/1991 | Takahashi et al. | ...................... 310/74 |
| 5,258,676 | * 11/1993 | Reinhardt et al. | .................... 310/112 |
| 5,652,470 | * 7/1997 | Heide et al. | ........................ 310/67 R |
| 6,093,984 | * 7/2000 | Shiga et al. | .......................... 310/156 |

* cited by examiner

*Primary Examiner*—Tran Nguyen
(74) *Attorney, Agent, or Firm*—Bacon & Thomas

(57) ABSTRACT

A magnet generator has multiple magnets received in a positioning seat of the rotator and a plurality of faces each corresponding to one of the magnets and formed on an outside face of the stator. With such an arrangement, when the generator of the invention is in operation, the generated rotation torque is greatly increased so as to drive a working disk with more power.

2 Claims, 10 Drawing Sheets

MAGNET GENERATOR

BACKGROUND OF THE INVENTION

1. Field of the Invention

The present invention relates to a magnet generator, and more particularly to a magnet generator having multiple magnets received in a positioning seat of the stator and a plurality of faces each corresponding to one of the magnets. With such an arrangement, when the generator of the invention is in operation, the generated rotation torque is greatly increased so as to drive a working disk with more power.

2. Prior Art Description

With reference to FIGS. 10, 11, a conventional magnet generator includes a shell 10, a silicon steel magnet 11 (stator), a rotator 12 and a shaft 13.

The shell 10 has a base 100 enabled to be mounted on a table (not shown), a compartment 101 defined in the shell 10 and a cover 102 engaged with the shell 10 to encase the rotator 12 and the shaft 13 in the compartment 101 and having a through hole 103 for the extension of the shaft 13.

The stator 11 securely received in the compartment 101 and distributed around an inner periphery defining the compartment 101 has multiple T-shaped faces 110 extending out from a periphery of the stator 11 and a multiple sets of coils 111 each mounted around one of the faces 110.

The rotator 12 is received in the compartment 101 and surrounded by the stator 11. The stator 12 has multiple protrusions 120 each corresponding to one of the faces 110 of the stator 11. A slit 121 is defined between two adjacent protrusions 120 and has a magnet 122 received therein. The rotator 12 further has an upper cover 123 with an central opening 123' and a lower cover 124 also with a central opening (not shown and numbered).

The shaft 13 extends through the central openings 123' of the upper cove 123, the stator 12 and the central opening of the lower cover 124. A lower distal end of the shaft 13 engages with a bottom face of the base 100 and an upper distal end of the shaft 13 extends through the through hole 103 of the cover 102. A disk 130 securely formed on the shaft 13 is provided to securely engage with the upper cover 123 of the rotator 12.

When the conventional generator is assembled and is controlled by the computer to work, the rotator 12 rotates around the shaft 13. Each of the magnets 122 continuously or intermittently corresponds to one of the faces 110. The generator generally drives a working disk (not shown) to rotate by the torque generated by the rotation of the rotator 12.

Although, the torque does drive the working disk to rotate, the thickness of the shell 10 and the thickness of an outer periphery of the stator 11 to the face 110 cause the driving radius (d) not sufficient and effective, which leads that the rotation range of the rotator 12 not enough. The rotation torque generated by the generator is not able to meet the requirement.

To overcome the shortcomings of the above mentioned patents, the present invention provides an improved magnet generator so as to obviate the above mentioned problems.

SUMMARY OF THE INVENTION

The primary objective of the invention is to provide an improved other objects, advantages and novel features of the invention will become more apparent from the following detailed description when taken in conjunction with the accompanying drawings.

DETAILED DESCRIPTION TO THE PREFERRED EMBODIMENT

Figure 1:
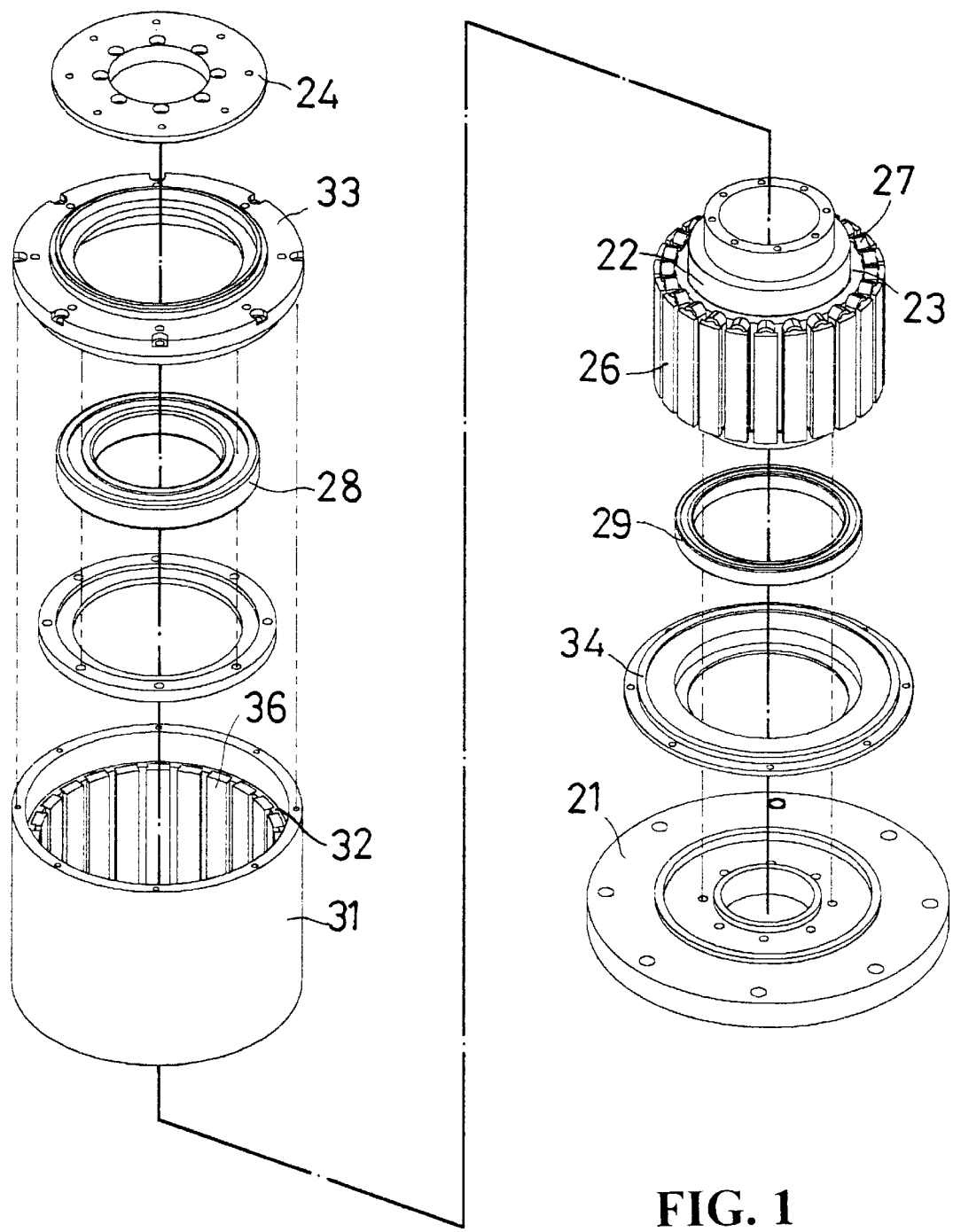
FIG. 1 is an exploded perspective view showing the parts of the invention.
Figure 2:
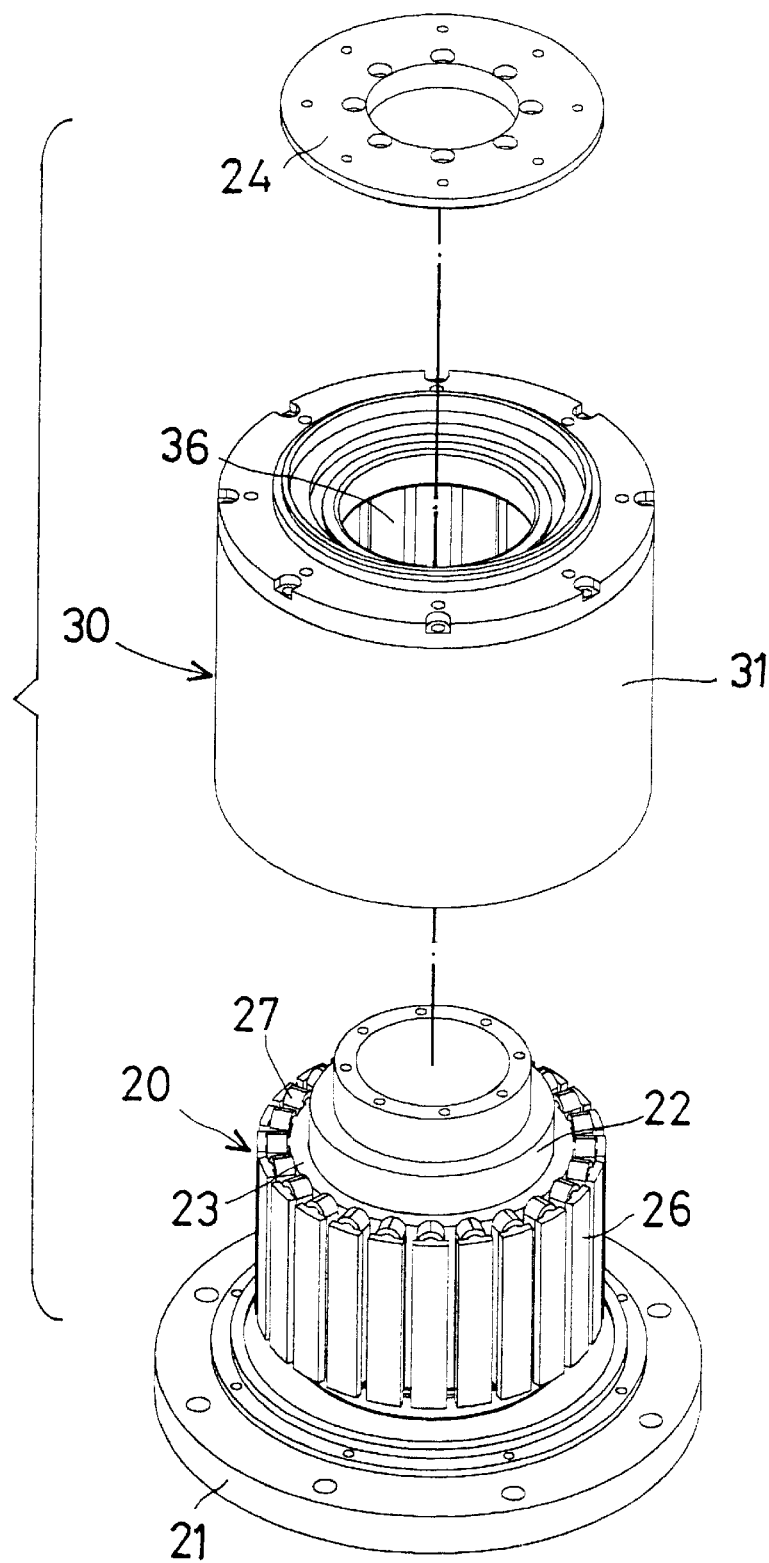
FIG. 2 is a perspective view of the assembled stator and the rotator of the invention.
Figure 3:
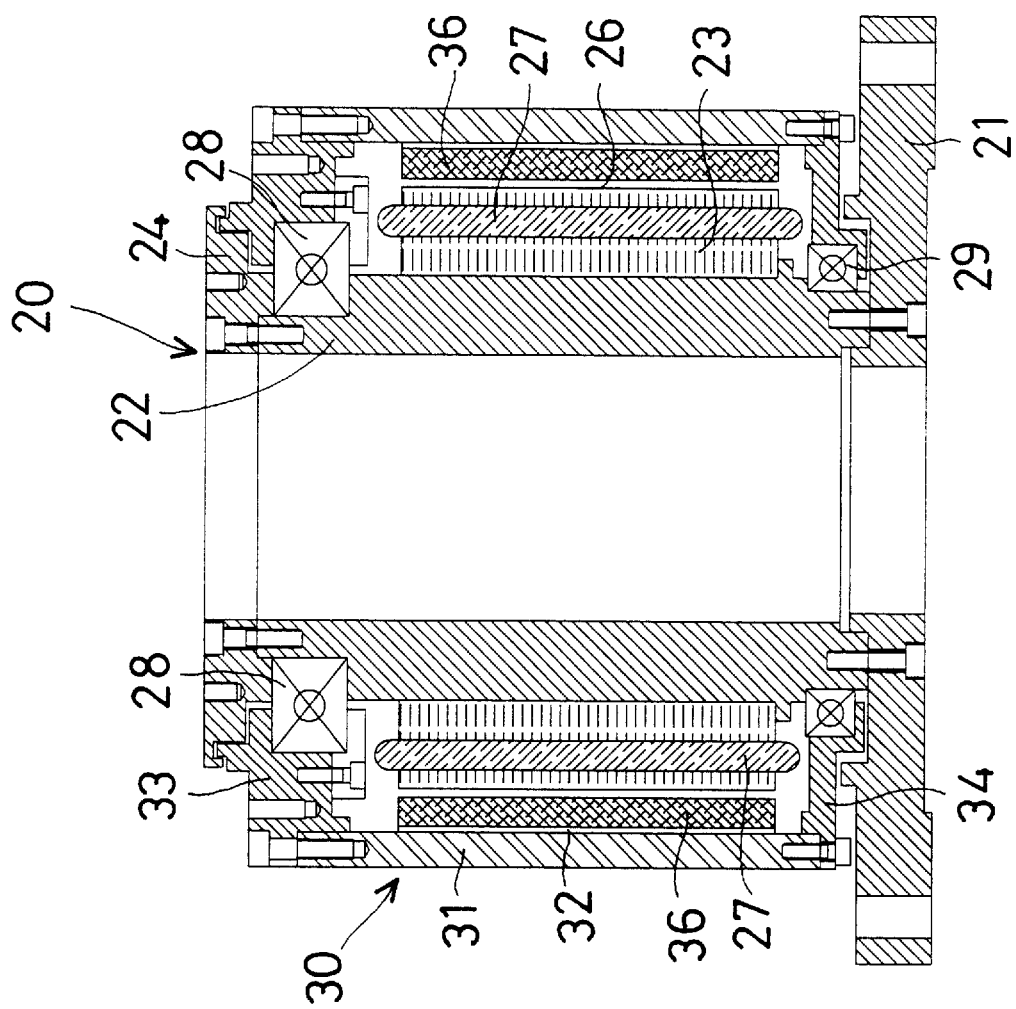
FIG. 3 is a cross sectional view showing the assembled generator constipated in accordance with the present invention.

With reference to FIGS. 1, 2 and 3, a generator constructed in accordance with the present invention comprises a stator 20 and a rotator 30.

Figure 4:
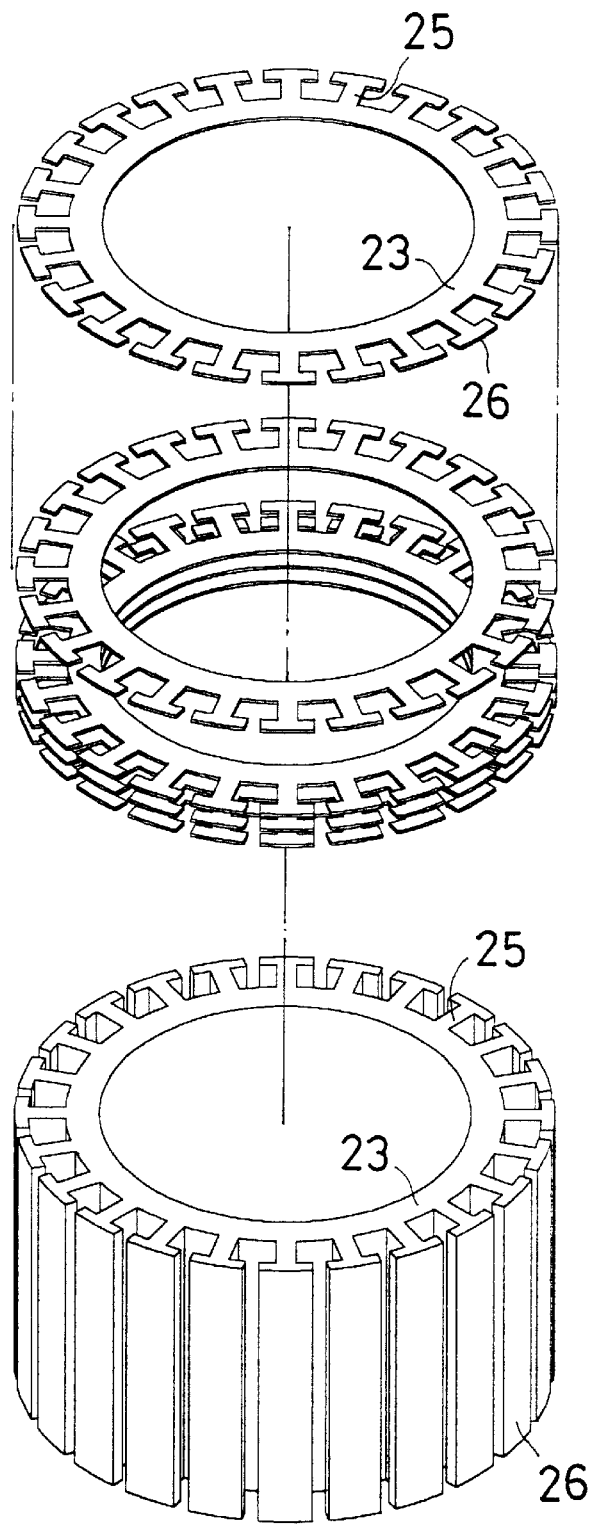
FIG. 4 is an exploded perspective view of the stator.
Figure 5:
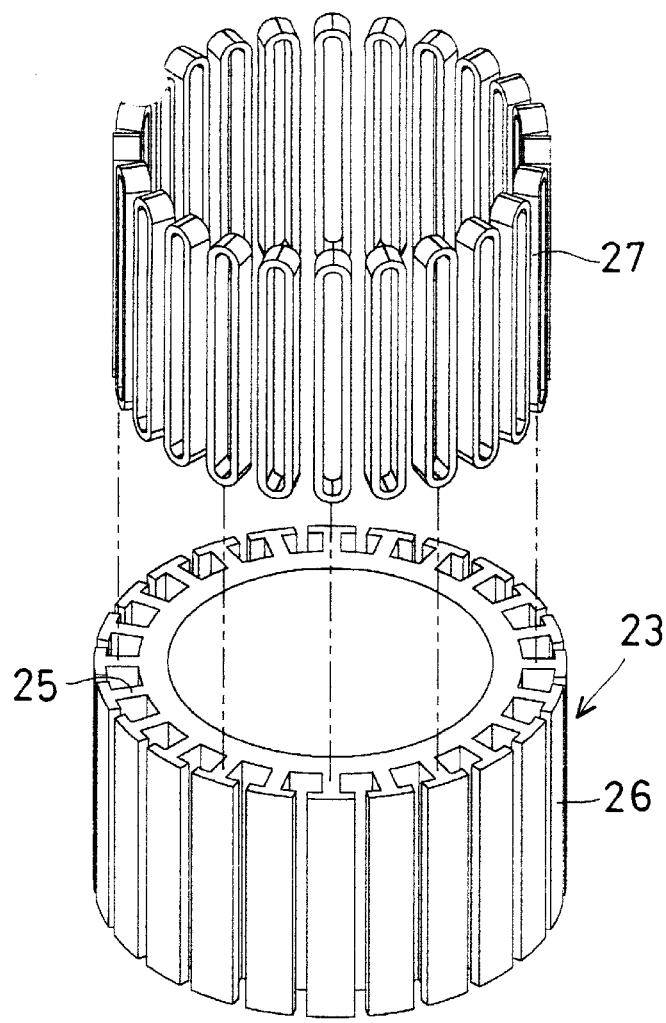
FIG. 5 is an exploded perspective view of the coil and the body of the stator.
Figure 6:
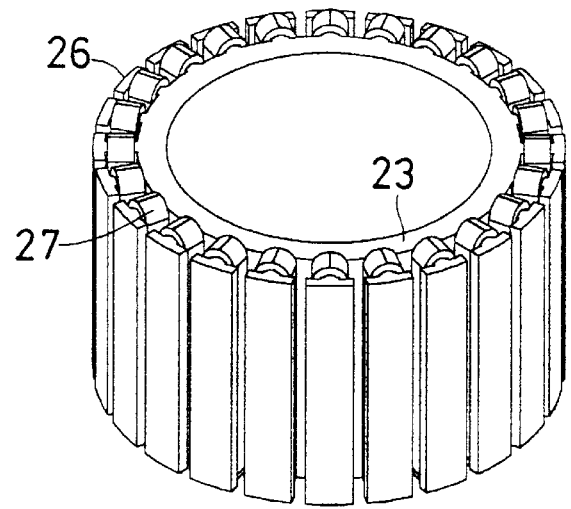
FIG. 6 is a perspective view of the assembled coil and the body of FIG. 7.

The stator 20 has a base 21, a positioning ring 22, a silicon steel magnet 23 and a securing ring 24. The base 21 can be mounted on a working table (not shown) and secured with the positioning ring 22. The positioning ring 22 has the silicon steel magnet 23 securely mounted on the outside face of the positioning ring 22 (as shown in FIG. 4). It is noted from the drawing that the silicon steel magnet 23 is composed of multiple silicon steel plates (not numbered) each having a T shaped extension 25 formed therewith and extending out therefrom. When the multiple silicon steel plates are assembled, the silicon steel magnet 23 is formed. An outside face of each of the assembled T shaped extension 25 forms a face 26. A coil 27 is mounted around a neck of the assembled T shaped extensions 25, as shown in FIGS. 5 and 6. A first bearing 28 and a second bearing 29 are respectively mounted on a top and a bottom of the positioning ring 22 and the securing ring 24 is mounted on top of the first bearing 28.

Figure 8:
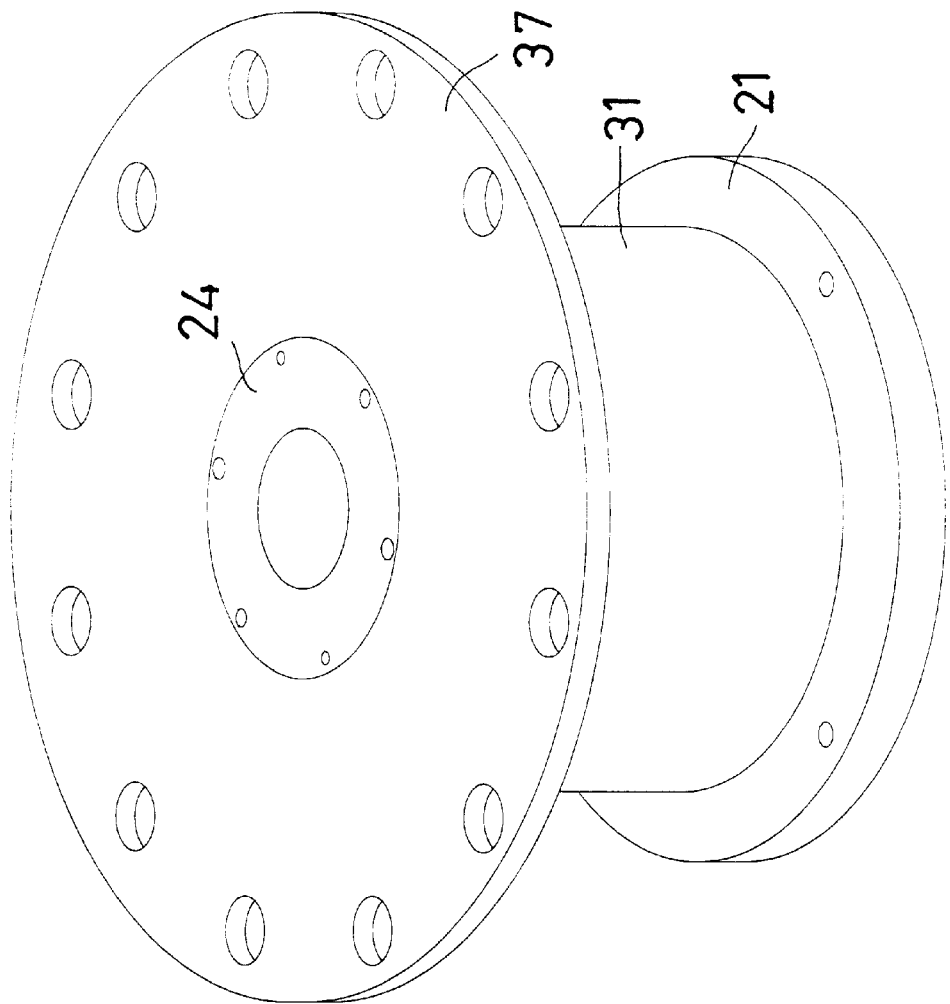
FIG. 8 is a perspective view showing a working disk used with the generator of the invention to transmit the rotation torque of the rotator.
Figure 9:
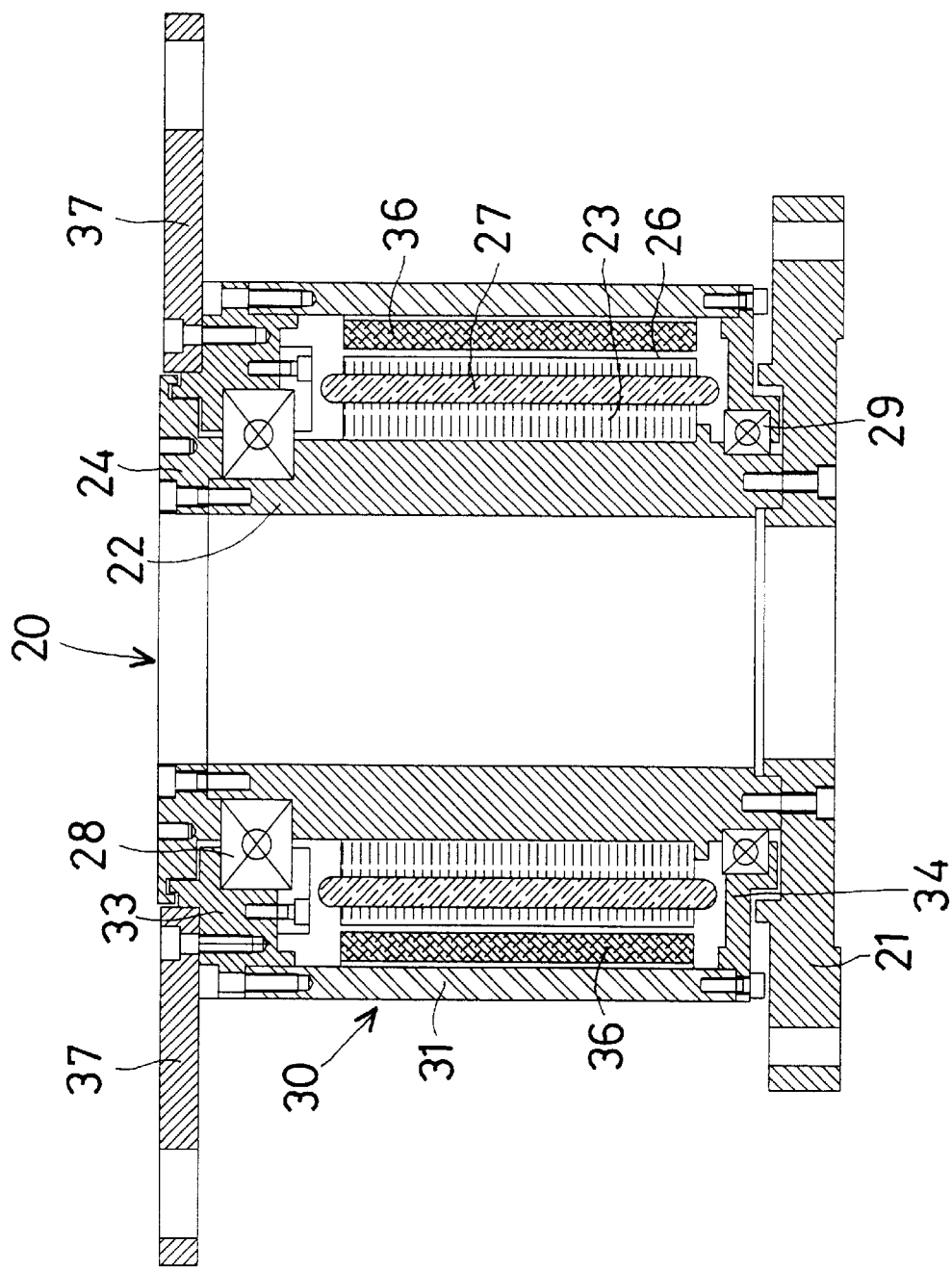
FIG. 9 is a cross sectional view of FIG. 8 taking the line 9—9.
Figure 10:
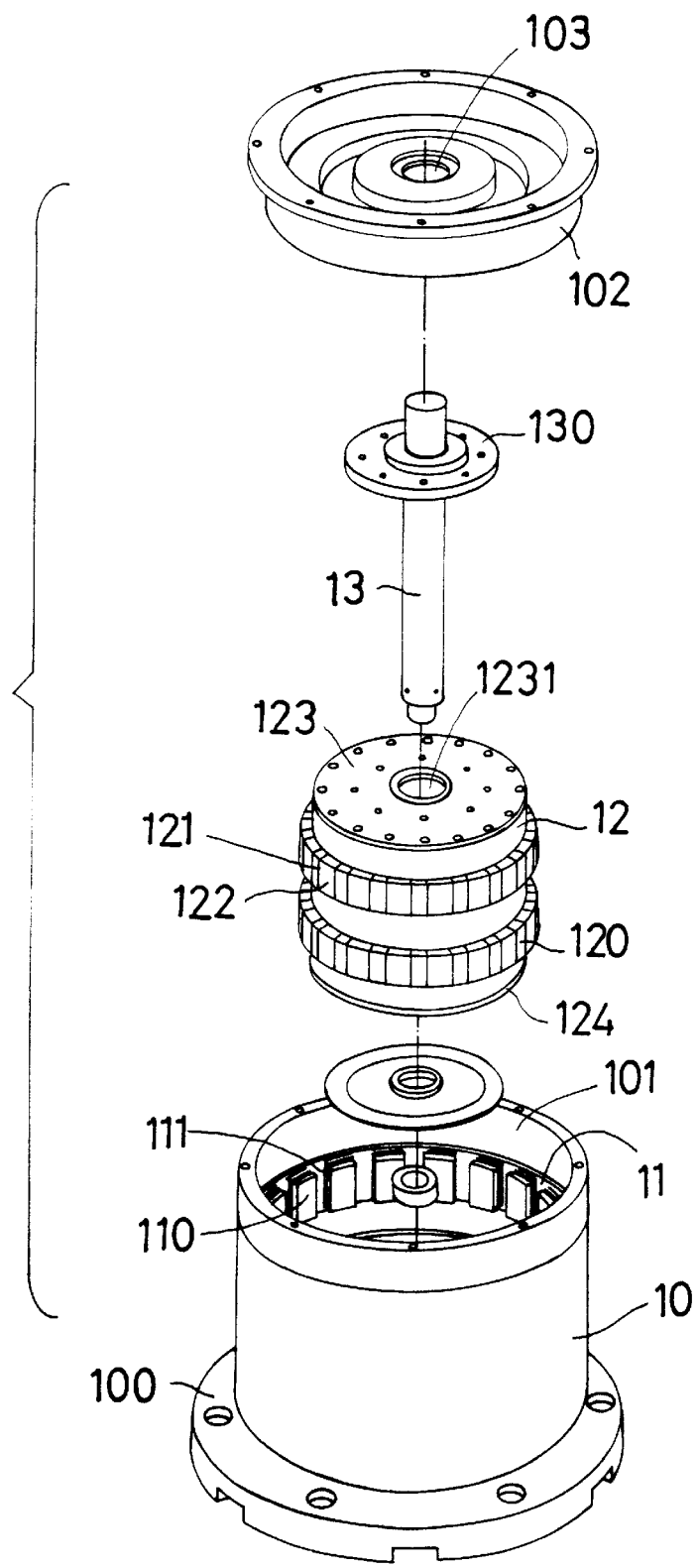
FIG. 10 is an exploded view of a conventional generator.

The rotator 30 has a shell 31, a positioning seat 32, a first ring 33 and a second ring 34. Multiple slits 35 are defined in a inside face of the positioning seat 32 and magnets 36 each corresponding to one of the faces 26 are respectively received in one of the corresponding slits 35. The first ring 33 is securely mounted on top of the shell 31 and an inner periphery of the first ring 33 is securely connected to the first bearing 28. The second ring 34 is securely mounted at a bottom of the shell 31 and an inner periphery of the second ring 34 is securely connected to the second bearing 29. With reference to FIGS. 8 and 9, a working disk 37 is able to be mounted on top of the first ring 33.

After the magnet generator of the invention is assembled and in operation, the interactive relationship between the magnets 36 and the coil 27 will drive the rotator 30 to rotate. Thus, the shell 31 is able to rotate by means of the assistance of the first ring 33, the second ring 34, the first bearing 28 and the second bearing 29.

Figure 7:
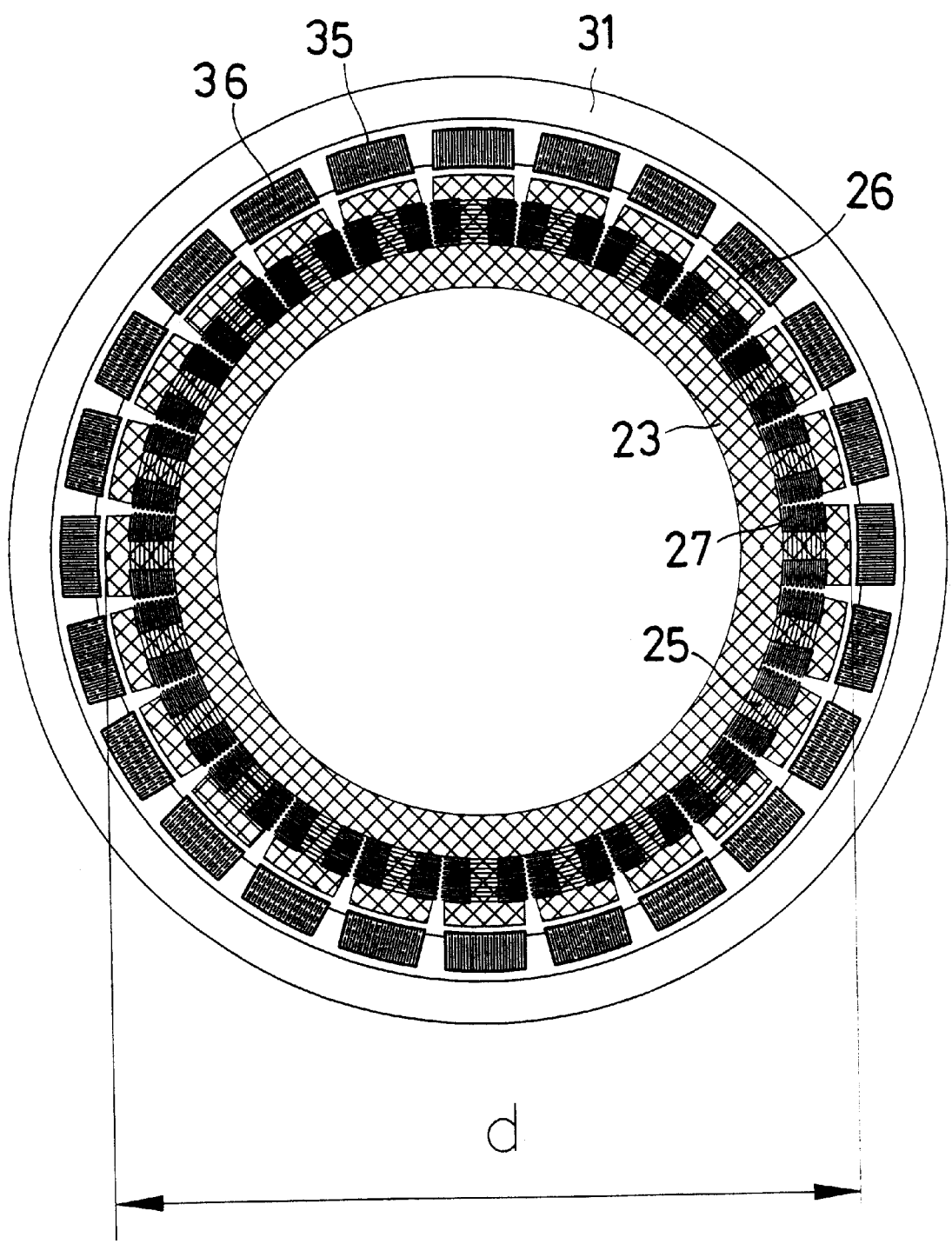
FIG. 7 is a schematic view showing the placement of the magnet of the invention.
Figure 11:
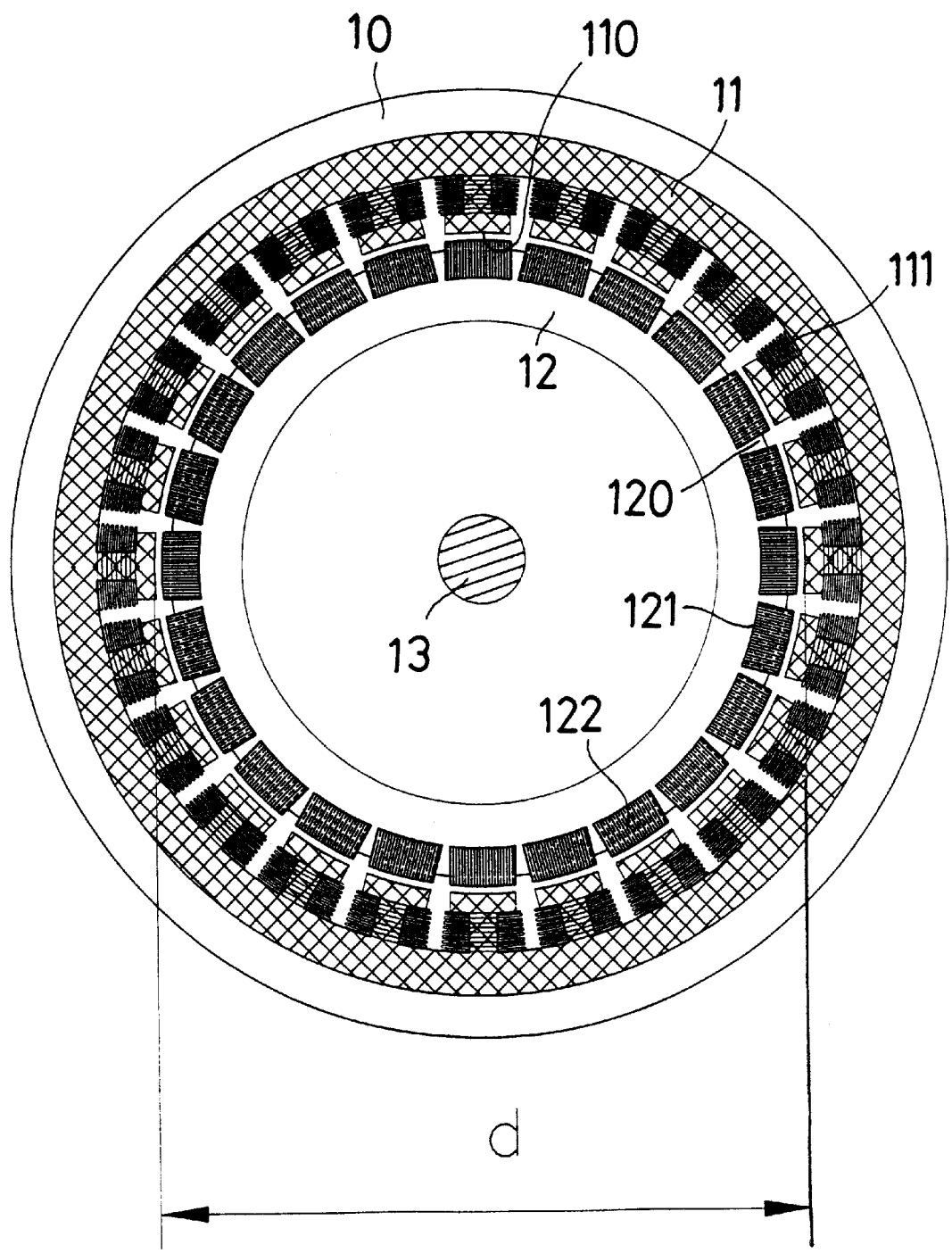
FIG. 11 is a schematic view showing the displacement of the magnet of The conventional generator.

It is noted that the magnets 36 are mounted on the positioning seat 32 that is securely received in the shell 31 and the silicon steel magnet 23 is securely attached to the positioning ring 22, such that when in operation, the generated rotation torque generated by the radius (d) (as shown in FIG. 7) the same as that disclosed in FIG. 11 will be increased. Therefore, the rotation torque is improved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A magnet generator comprising a stator and a rotator, wherein the stator has a base, a positioning ring, a silicon steel magnet and a securing ring, the base is secured with the positioning ring, the positioning ring has the silicon steel magnet securely mounted on an outside face of the positioning ring, the silicon steel magnet is composed of multiple silicon steel plates each having a T shaped extension formed therewith and extending out therefrom, wherein an outside face of each of the T shaped extension forms a face, a coil is mounted around a neck of the assembled T shaped extensions, a first bearing and a second bearing are respectively mounted on a top and a bottom of the positioning ring and the securing ring is mounted on top of the first bearing;

wherein the rotator has a shell with the stator rotatably received therein and includes a positioning seat, a first ring and a second ring, wherein multiple slits are defined in an inside face of the positioning seat and magnets are respectively received corresponding slits, the first ring is securely mounted on top of the shell and an inner periphery of the first ring is securely connected to the first bearing, the second ring is securely mounted at a bottom of the shell and an inner periphery of the second ring is securely connected to the second bearing.

2. The generator as claimed in claim 1, wherein a working disk is able to be mounted on top of the first ring.

\* \* \* \* \*